US010527024B2

(12) United States Patent
Vital Amuchastegui et al.

(10) Patent No.: US 10,527,024 B2
(45) Date of Patent: Jan. 7, 2020

(54) PREVENTING WIND TURBINE MISALIGNMENT SITUATIONS

(71) Applicant: GAMESA INNOVATION & TECHNOLOGY, S.L., Sarriguren Navarra (ES)

(72) Inventors: Pablo Vital Amuchastegui, Sarriguren Navarra (ES); Octavio Hernandez Mascarell, Madrid (ES); Alberto Moreno Robles, Madrid (ES); Carlos Pizzarro de la Fuente, Madrid (ES); Jaime Suarez Aizpun, Madrid (ES)

(73) Assignee: Siemans Gamesa Renewable Energy Innovation & Technology, S.L., Sarriguren (Navarra) (ES)

( * ) Notice: Subject to any disclaimer, the term of this patent is extended or adjusted under 35 U.S.C. 154(b) by 135 days.

(21) Appl. No.: 15/741,418

(22) PCT Filed: Jul. 1, 2016

(86) PCT No.: PCT/ES2016/000073
§ 371 (c)(1),
(2) Date: Jan. 2, 2018

(87) PCT Pub. No.: WO2017/005945
PCT Pub. Date: Jan. 12, 2017

(65) Prior Publication Data
US 2018/0372070 A1 Dec. 27, 2018

(30) Foreign Application Priority Data

Jul. 30, 2015 (ES) .................................. 2015000494
Nov. 16, 2015 (EP) ..................................... 15003253

(51) Int. Cl.
*G05D 9/00* (2006.01)
*G05D 7/00* (2006.01)
(Continued)

(52) U.S. Cl.
CPC ............ *F03D 7/0204* (2013.01); *F03D 7/045* (2013.01); *F03D 80/85* (2016.05); *G05B 17/02* (2013.01);
(Continued)

(58) Field of Classification Search
CPC ...... F03D 80/85; G05B 17/02; F05B 2270/20
(Continued)

(56) References Cited

U.S. PATENT DOCUMENTS

2008/0111379 A1  5/2008 Attemark
2010/0066087 A1* 3/2010 Hayashi ............... F03D 7/0204
290/44
(Continued)

FOREIGN PATENT DOCUMENTS

DE    102009015167 A1   9/2010
EP    2 267 301 B1       6/2009
(Continued)

OTHER PUBLICATIONS

International Search (ISR) and Written Opinion (WO) dated Sep. 26, 2016 for International Application No. PCT/ES2016/000073.
(Continued)

*Primary Examiner* — Md Azad
(74) *Attorney, Agent, or Firm* — Ladas & Parry LLP

(57) ABSTRACT

Control system to prevent wind turbine misalignment situations employing mathematical algorithms implemented in the wind turbine controller. Different optimization algorithms have been analyzed getting results that yaw the nacelle of the wind turbine to positions that would maximize the efficiency function. Control system for detecting and preventing wind turbine misalignment situations that comprises a parameters acquisition unit that relates the wind direction with the deviation of the wind turbine nacelle, a (Continued)

wind turbine efficiency function calculation unit and a deviation comparison unit of the nacelle.

8 Claims, 5 Drawing Sheets

(51) Int. Cl.
  *F03D 7/02*  (2006.01)
  *F03D 80/80*  (2016.01)
  *F03D 7/04*  (2006.01)
  *G05B 17/02*  (2006.01)

(52) U.S. Cl.
  CPC ....... *F05B 2260/84* (2013.01); *F05B 2270/20* (2013.01); *F05B 2270/32* (2013.01); *F05B 2270/321* (2013.01); *F05B 2270/327* (2013.01); *F05B 2270/329* (2013.01); *F05B 2270/335* (2013.01)

(58) Field of Classification Search
  USPC ......................................................... 700/275
  See application file for complete search history.

(56) References Cited

U.S. PATENT DOCUMENTS

| | | | |
|---|---|---|---|
| 2011/0101691 A1 | 5/2011 | Hashimoto et al. | |
| 2012/0051907 A1* | 3/2012 | Rogers | F03D 7/0224 416/1 |
| 2012/0237346 A1* | 9/2012 | Mascarell | F03D 7/0224 416/1 |
| 2013/0004312 A1* | 1/2013 | Friedrich | F03D 7/0204 416/1 |
| 2013/0114067 A1 | 5/2013 | Belen, Jr. et al. | |
| 2014/0203562 A1* | 7/2014 | Black | F03D 7/043 290/44 |
| 2014/0234103 A1* | 8/2014 | Obrecht | F03D 7/0204 416/9 |
| 2015/0086357 A1 | 3/2015 | Gregg | |
| 2017/0198680 A1* | 7/2017 | Wu | F03D 7/0204 |
| 2018/0073486 A1* | 3/2018 | Zhang | F03D 7/0284 |

FOREIGN PATENT DOCUMENTS

| | | |
|---|---|---|
| EP | 2154362 A1 | 2/2010 |
| EP | 2 159 416 A2 | 3/2010 |
| EP | 2 626 549 A1 | 8/2013 |
| MX | 2013009285 A | 2/2014 |
| WO | 2013/027127 A2 | 2/2013 |

OTHER PUBLICATIONS

Espacenet English abstract of MX 2013009285 A.
N. Killingsworth, et al., "PID tuning using extremum seeking—Online model-free performance optimization" (ESC algorithm: Extremum-Seeking Control), IEEE Control Systems Magazine, 26(1), pp. 70-79, Feb. 2006.
H00 algorithm: Hierarchical Optimistic Optimization, S. Bubeck et al., "Online Optimization in x-armed bandits", OPT 2008 Optimization for Machine Learning. https://opt2008.kyb.tuebingen.mpg.de/papers/bubeck.pdf based on yaw sweeps.
D. Marbach, et al., "Online Optimization of Modular Robot Locomotion" (Modified Secant algorithm, based on the Brent method), Proceedings of the International Conference on Mechatronics & Automation, Canada, Jul. 2005 IEEE, pp. 248-253).
Supplementary European Search Report (SESR) dated Apr. 2, 2019 for Application No. EP 168213883.3.
Espacenet English abstract of DE 102009015167 A1.
Ferret, F. A., et al., "Sensorless Active Yaw Control for Wind Turbines", IECON'01, Proceedings of the 27th Annual Conference of the IEEE Industrial Electronics Society, Denver, CO, New York, vol. 2, pp. 1370-1375, XP010572977; DOI: 10.1109/IECON.2001.975981; ISBN: 978-0-7803-7108-8; the whole document; 2001.

* cited by examiner

PREVENTING WIND TURBINE MISALIGNMENT SITUATIONS

RELATED APPLICATION

This application is an application under 35 U.S.C. 371 of International Application No. PCT/ES2016/000073 filed on Jul. 1, 2016, the entire contents of which are incorporated herein by reference.

FIELD OF THE INVENTION

The present invention refers to a device and a control system method to prevent wind turbine misalignment situations, employing mathematical algorithms implemented in the wind turbine controller based on operational variables to minimize a wind turbine's losses in annual energy production (AEP).

BACKGROUND OF THE INVENTION

A horizontal axis wind turbine consists of a stationary tower that elevates a nacelle bearing an electrical generator attached to a rotor mechanically. The rotor comprises a hub that attaches at least one blade, which transforms the wind's kinetic energy in the rotating rotor.

It is known in the state of the art that the optimum operating point of a horizontal axis wind turbine is achieved when the rotor shaft is parallel to the direction of the wind, since this maximizes the energy produced while minimizing loads. However, the optimum production and the maximum perpendicularity to the wind do not coincide in general, due to any wind condition that generates speed asymmetries in the rotor plane. This is wind dependent and different in each wind turbine.

The nacelle is capable of moving on its supporting tower to enable the rotor to position itself (yawing) in the direction of the wind through a mechanical system that moves it to the desired orientation (yaw system) with a view to best harnessing the wind and producing the most power. This yaw system turns the wind turbine nacelle around a vertical yaw axis, which coincides with the vertical axis of the tower until the rotational axis of the blades are parallel with the wind direction. When this optimum position is not reached, the wind turbine has a yaw error determined by the angle of deviation with respect to said optimal position.

However, given the natural variability of the wind direction, there is a need for systems that constantly detect the wind direction and consequently adjust the position of the wind turbine so as to best harness the wind to produce maximum power. However, extreme misalignment with respect to the wind direction also causes an increase in loads on wind turbine components, resulting in the deterioration thereof.

In this regard, the yaw system has a wind direction measuring system comprising sensors, usually installed at the top of the wind turbine nacelle behind the rotor.

Nonetheless, in wind direction measurement there are various factors to consider that could cause retrieval of a flawed measurement value, namely the rotor's influence on the descending air currents, faulty operation of the sensors because of erroneous installation and/or configuration, ascending airflow due to the location of each wind turbine and, lastly, developments in internal blade section designs, which have evolved toward greater aerodynamic effectiveness and produce greater airflow deflection. The foregoing causes the wind turbine not to operate in the desired conditions.

US2015086357A1 describes a method for adjusting yaw bias in wind turbine defining an operational condition for the wind turbine during operation of the wind turbine. This method is hardly automatable, requiring subsequent manual procedures.

There are solutions in the state of the art that address misalignment issues by positioning the sensors in front of the wind turbine rotor, e.g., patent EP2626549A1.

Patent US2013114067A1 describes an optical control system for a wind turbine comprising the incorporation of some sensors at the front of the wind turbine rotor that provides some measurements that, in combination with the data obtained in the wind turbine nacelle sensors, enable the positioning of the wind turbine in the optimum position.

Known state of the art includes other solutions such as patent EP2267301B1, which describes a wind turbine yaw control system that incorporates a wind channel that runs through the wind turbine hub and comprises an air flow measuring device to determine the yaw error through a control system. However, this solution cannot be applied to wind turbines that are already installed.

The existing solutions in the state of the art are based on the same idea: to measure the wind in the rotor and its comparison with the measurement of the sensor in the nacelle. This requires the use of additional sensors to those existing in a wind turbine (speed measurement sensors, wind direction measurement, power measurement and rotor rotation measurement) with the cost involved, in addition to the installation, removal and calibration of each measuring device of each wind turbine that needs to be adjusted.

In light of the drawbacks of the aforementioned solutions, a need is thus envisioned for implementing a solution that could, by employing the means already existing on the wind turbines, guarantee a correct yaw error measurement to be able to position the nacelle wind turbine at the optimum operating position to assure the efficiency. The characteristics of the optimization algorithm allow the complete automation of the process, which is a technical advantage over many manual procedures of the state of the art.

DESCRIPTION OF THE INVENTION

The object of the present invention is to overcome the inconveniences of the state of the art by using only basic variables such as power, wind speed, wind direction or speed of rotation of the motor for the correct measurement of the yaw misalignment by means of a systematic error control system in the alignment of the nacelle wind turbine with respect to the wind direction that optimizes the production, being general and automatic, so that it can be applied to any type of horizontal axis wind turbine installed in any location of a wind farm and that it does not imply adding additional measuring devices to those already in place (sensors for measuring wind speed and direction, power and rotor rotation). The objective of the invention is to detect the systematic misalignment of the existing orientation device with respect to positions that would maximize the efficiency function Therefore, the present invention entails, an automation of the alignment method without the need of additional sensors to the conventionally existing in the horizontal axis wind turbines, a numerical method that directs the search of the optimal result drastically reducing the time necessary to obtain stable results, and a low frequency filtering procedure and automatic convergence statistical criterion.

From the State of the Art, it is known that the loss in power generated wind turbines caused by a yaw error follows a curve based on the cos² law (see FIG. 2), and power losses can be estimated on the basis of the different misalignment angles.

In this regard, an object of the invention is that the control system determines the need to measure the yaw angle and quantifies the misalignment value through not only direct measurement of the wind direction but also a set of values depending on the wind speed.

The invention also mitigates the effects of the misalignment through corrective measures that apply the values obtained in the measurements, in either the PLC or data acquisition hardware.

For this the nacelle is oscillated at a constant rate in which there are no influences of meteorological variations (bursts, turbulence, shear changes, diurnal and seasonal oscillations) or variations of the wind turbine (tower resonance, rotation of the rotor or vibration modes). These oscillations have frequency ranges lower than any mode of operation of the wind turbine and higher than any variation of weather type.

Additionally, an algorithm of numerical analysis is associated between efficiency optimization algorithms that has as objective to find a function $y=f(\theta)$ that maximizes the efficiency of the wind turbine where $\theta$ * is the optimal alignment, the solution at each moment is proportional to the change or derivative of the analyzed function $f$ and that incorporates a filtering stage to attenuate low frequencies of the components that generate the wind and meteorological characteristics and high frequencies of the components of the wind turbine.

The object of the invention lies in the association of the numerical analysis method with the variations in efficiency caused by the nacelle oscillations. Efficiency being the power produced at each instant with respect to the wind.

For this, the implementation of a numerical efficiency optimization algorithm is foreseen (FIG. 4B), based on the influence of the misalignment in the power curve of the wind turbine (FIG. 2) and that includes a filtering stage where the highs are attenuated and the low frequencies of the components. This kind of algorithms can be implemented in any current conventional wind turbine.

The advantages of the control system with respect to the existing in the state of the art are:
  the optimization algorithm allows the complete automation of the procedure
  does not need additional sensors to those existing in the wind turbine (wind measurement sensor, wind speed measurement sensor, rotor speed sensor and power measurement sensor)
  Use of basic variables such as power, wind speed, rotor rotation speed
  minimum convergence times of the algorithm and low uncertainty of the results.

These optimization algorithms of numerical analysis enable a search for an optimal condition (alignment angle $\theta$*) without any previous knowledge of the farm, and require input information of the cost function to optimize. This optimization algorithm of numerical analysis should have a filtering stage of low and high frequencies of wind turbine component and could be an algorithm of the following type:
  ESC algorithm: Extremum-Seeking Control (IEEE control systems. 26(1):70-79.).
  HOO algorithm: Hierarchical Optimistic Optimization (Bubeck,S et al. "Online Optimization in x-armed bandits". OPT 2008 Optimization for Machine Learning. https://opt 2008.kyb.tuebingen.mpg.de/papers/bubeck.pdf based on yaw sweeps.
  Modified Secant algorithm, based on the Brent method (International Conference on Mechatronics & Automation, 2005, pages 248-253)

Another object of the invention is a control system capable of anticipating any possible failure in the measuring sensors, thus the control systems conducts redundant readings of the wind direction.

These and other aspects of the invention will be described in more detail with the help of the drawings shown below.

BRIEF DESCRIPTION OF THE DRAWINGS

The invention and its mode of operation can be understood more comprehensively from the following detailed description together with the following schematic figures.

EMBODIMENT MODES OF THE INVENTION

Figure 1:
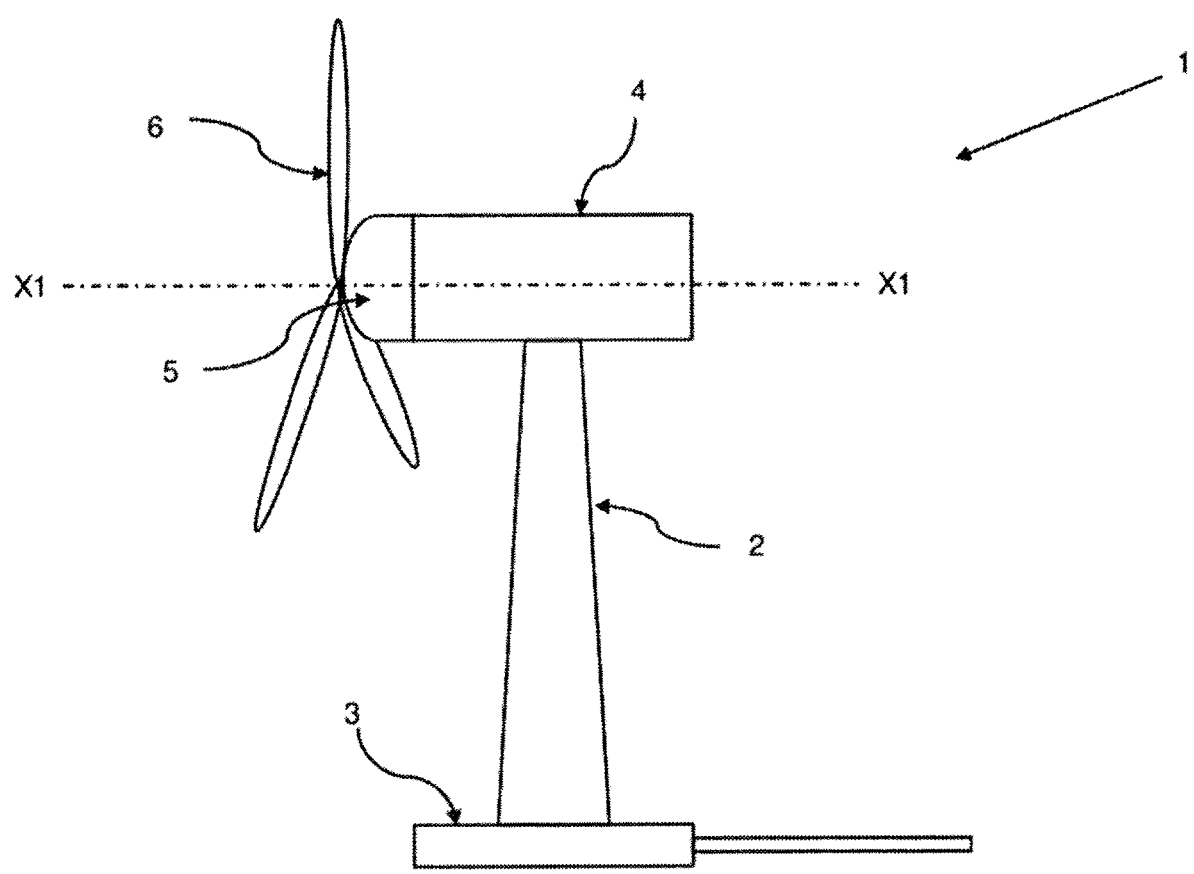
FIG. 1 shows a perspective view of a conventional wind turbine.

FIG. 1 is a side view illustrating a wind turbine (1) according to one preferential embodiment of the invention. The wind turbine (1) includes a tower (2) that stands vertically on a foundation (3), a nacelle (4) mounted on the top part of the tower (2), and a rotor (5) mounted on the front end of the nacelle (4) for rotational support with respect of a substantially horizontal axis X1-X1.

Figure 3A:
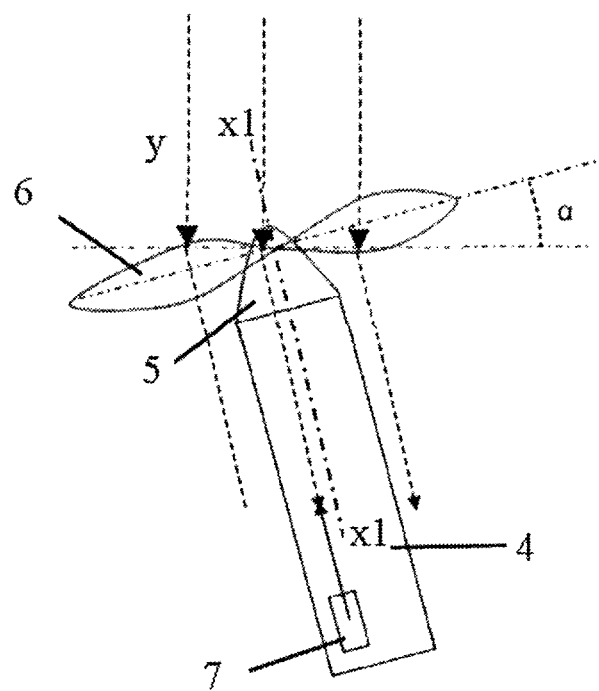
FIGS. 3a and 3b respectively depict plant views of a wind turbine whose nacelle deviates from the wind direction and a wind turbine whose nacelle is aligned with the wind direction.
Figure 3B:
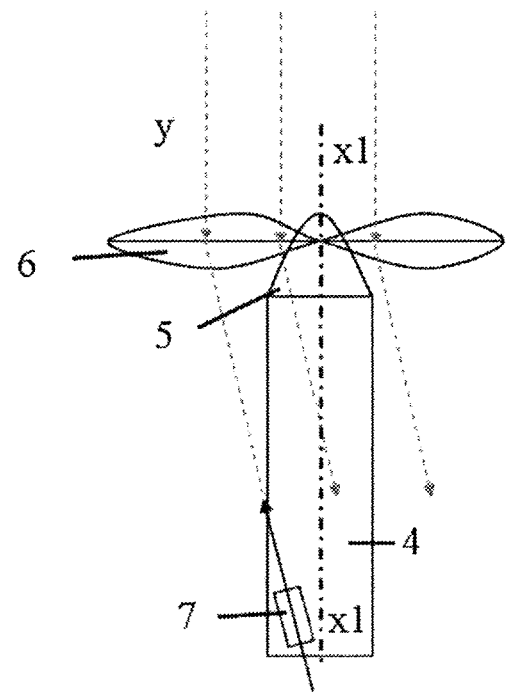

The rotor (5) has at least one blade (6), as shown in FIG. 1, mounted in a radial pattern with respect of its rotational axis. Thus, the energy from the wind when blowing against the wind turbine blades (6) from the direction of the rotational axis of the rotor (5) is converted into kinetic energy that rotates the rotor (5) on the rotational axis. As shown in FIGS. 3a and 3b, an anemometer or anemoscope (7) measures the wind speed in the immediate area or the wind direction, for which appropriate spots are available on the edge of the outer surface (on the top, for instance) of the wind turbine nacelle (4).

The wind flow passing through the rotor (5) acquires a rotational moment in the direction opposite to the rotation of the rotor (5). The wind current measured by the anemoscope (7) which is placed in the nacelle is deviated from its original counter-current direction of the wind turbine. This effect depends on the profile of the blade root, the shape of the nacelle and the positioning of the sensor in the nacelle (4). This phenomenon can be seen in FIG. 3a.

Wind turbine misalignment is construed as the condition in which the wind turbine nacelle deviates at an angle ($\alpha$) from the real wind direction ($\gamma$) at specific moments. Refer to FIG. 3a. This deviation ($\alpha$) of the nacelle (4) with respect to the wind direction ($\gamma$) could be surmised from different reasons; when attaining a generated power curve less than the estimated value for optimum operating conditions, by comparing the real position ($\alpha$) of the nacelle (4) and the position that it should have based on the real direction data ($\gamma$) of the wind obtained from the anemoscope (7), or visually when observing an alignment differing from the surrounding wind turbines.

FIG. 3a depicts a wind turbine whose nacelle has a deviation ($\alpha$) with respect to the wind direction ($\gamma$), in which the wind does not strike the blades at a correct incidence and thus reducing power production, while FIG. 3b depicts a wind turbine correctly yawed with respect to the wind direction ($\gamma$). In FIG. 3b, the sensor is misaligned with respect to the wind incident on the rotor, but the reference sent to the alignment logic includes a ° correction and therefore the nacelle is correctly aligned.

Figure 2:
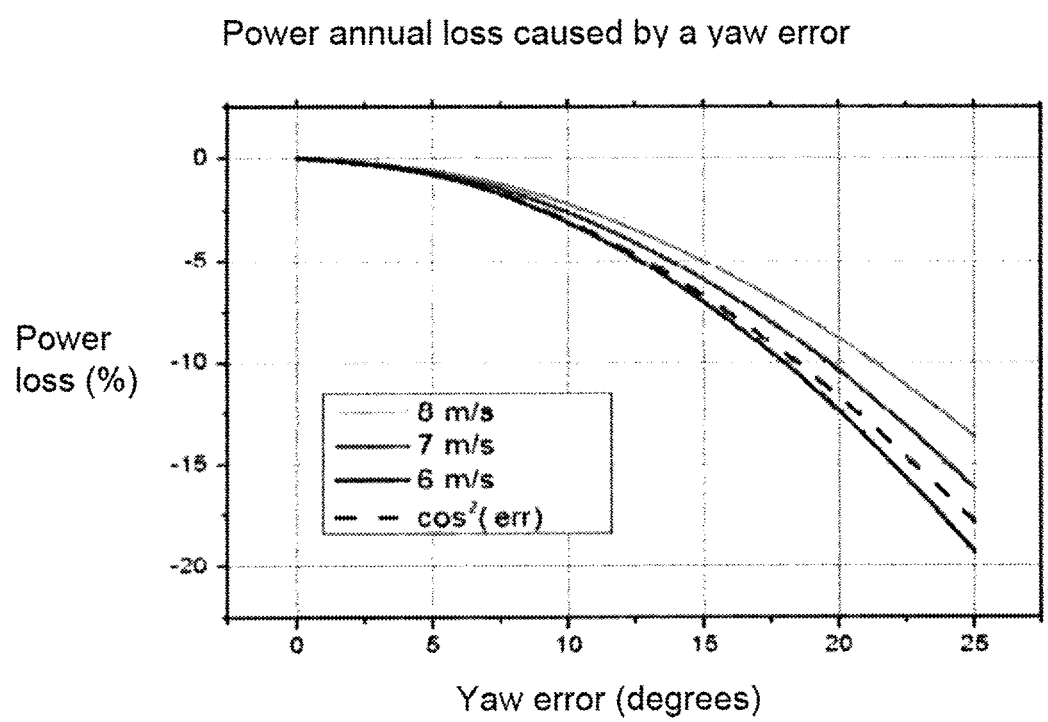
FIG. 2 depicts a curve of the existing relationship between the generated power and the yaw angle of the wind turbine according to the State of the Art.

On the other hand, from the State of the Art, it is known that the loss in power generated wind turbines caused by a yaw error follows a curve based on the $\cos^2$ law (see FIG. 2), and power losses can be estimated on the basis of the different misalignment angles($\alpha_i$).

In this regard, it is imperative to ascertain the real value of the deviation of the nacelle (4) of the wind turbine (1) with respect to the wind direction ($\gamma$) so that it can be corrected. However, it is known that noise, turbulences, vibrations of the nacelle (4) and other factors could affect the wind direction reading ($\gamma$) by the anemometer (7), hence it is necessary to relate the yaw angle deviation ($\alpha$) with respect to another variable such as the wind speed.

To do so, the control system of the invention (FIG. 4A) makes the nacelle oscillate by making periodic movements in the yaw of the nacelle (4) with respect to the wind direction, at a constant rate in which there are no influences of variations weather such as bursts, turbulence or changes of cuts among others. The oscillations have frequency ranges preferably lower than any mode of operation of the machine, therefore lower than 0.1 Hz and preferably higher than any variation of the meteorological type, therefore higher than 0.0005 Hz. When the nacelle is oscillated, there should also be no interference from the operation of the machine such as tower resonance, rotor rotation or other vibration modes. The power variation data is extracted with known modulation and filtering techniques, which is combined with a numerical algorithm of power optimization (FIG. 4B) that is based on obtaining the optimum value of an efficiency function $f$ obtained of the aerodynamic power model of each wind turbine (1) and that must carry a filtering stage attenuating low and high frequencies of the components of the wind turbine.

Figure 4A:
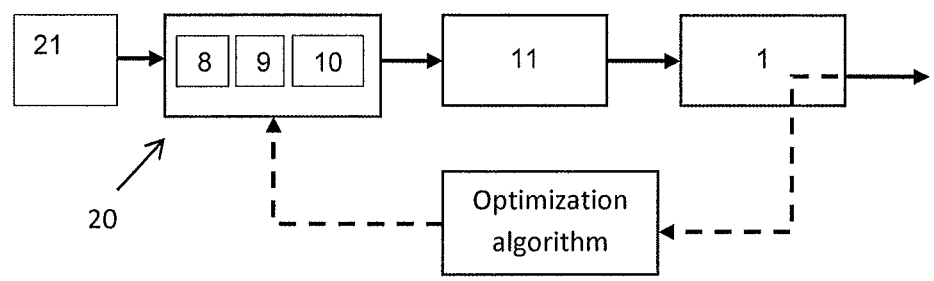
FIG. 4A shows a diagram of the control system implemented in the wind turbine according to the invention.
Figure 4B:
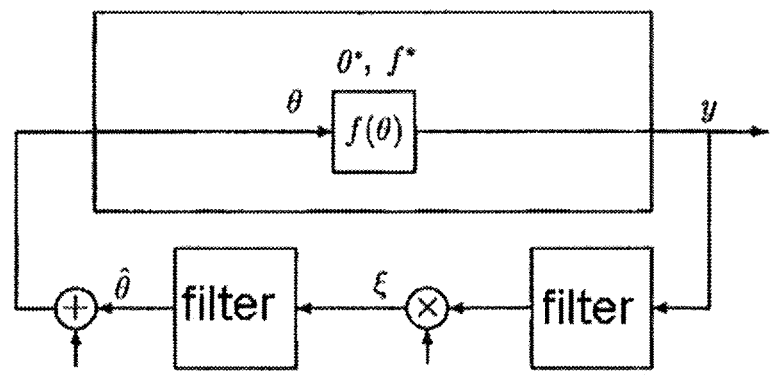
FIG. 4B shows a diagram of the algorithm implemented in the control system.

The algorithm shown in FIG. 4B forces sinusoidal oscillations of low frequency and high amplitude in the nacelle. These oscillations must be invisible from the rest of the wind turbine control to prevent the yaw control from trying to counteract them. Being $f(\theta)$ the efficiency, k the gain of the algorithm, h the characteristic parameter of the filter, s the variable of Laplace, a and w the amplitude and the frequency respectively, $\theta$ * is the optimal value of alignment of the nacelle that maximizes the $f(\theta)$, so $f(\theta$ *) will be $f$ *. k/s is the filter that attenuates low frequencies and s/s+h the filter that attenuates high frequencies.

The value $\theta$ * is the one corresponding to the maximum power measured in the forced oscillation of the nacelle caused by the algorithm.

The objective is to find an optimal value $\theta$ * that maximizes the efficiency function $f$ *.

Optimization algorithm assures stability and convergence of the result. The type of this optimization algorithm of numerical analysis could be: ESC (Extremum Seeking Control), the HOO (Hierarchical Optimistic Optimization) algorithm, based on yaw sweeps, or the Modified Secant algorithm, based on the Brent method.

This function of efficiency $y=f(\theta)$ is the ratio between the power measured by the wind turbine sensors and the power available in the wind. The yawing of the nacelle (4) moves progressively toward the positions that maximize this efficiency function, until reaching the maximum $f$ *, and remains stable at a preset deviation value.

The optimization algorithm is implemented in a modular composition, in such a way that it does not affect the controller. FIG. 4A shows how the algorithm is integrated into the existing software in the wind turbine. The algorithm is compatible with the normal operation of the wind turbine, including maintenance actions, alarms among others. The misalignment signal of the wind direction sensor is sent to the alignment logic unit that subsequently orients the wind turbine nacelle. The output signal of the optimization algorithm is also sent to the alignment logic unit to calculate the error and the modulation signal The control system (20) of the invention, as depicted in FIG. 4, comprises a parameters acquisition unit (8) that relates the wind direction ($\gamma$) with the deviation ($\alpha$) of the wind turbine nacelle (4), a wind turbine efficiency function calculation unit (9) of the efficiency function of the wind turbine (1) and a deviation comparison unit (10) of the nacelle (4) and, through a power optimization algorithm that progressively yaws the wind turbine nacelle (4) to positions that would maximize the efficiency function.

Figure 5:
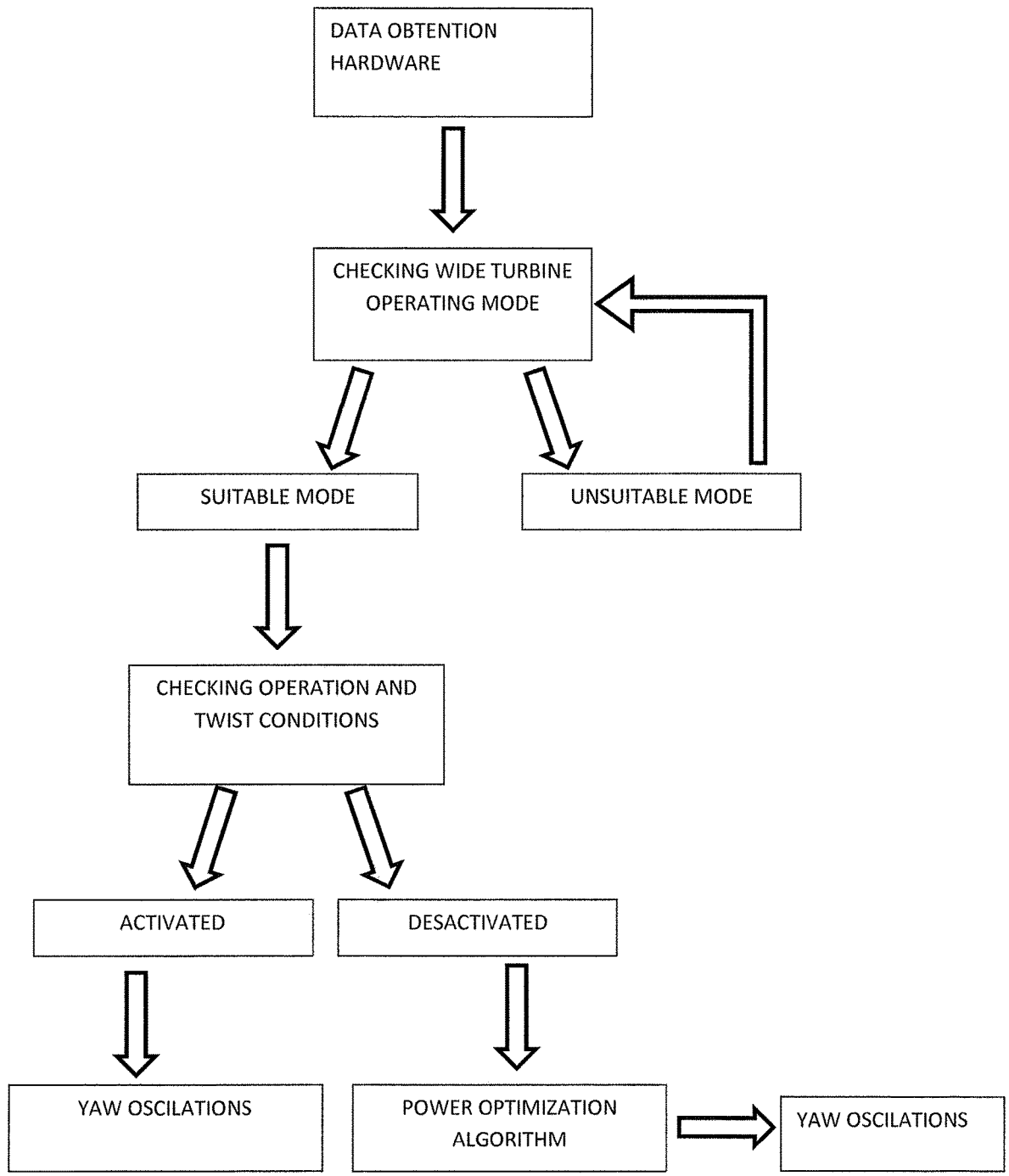
FIG. 5 shows a diagram of the operating flow of the control system.

As shown in the flow diagram of the FIG. 5, the control system (20) follows the steps below:

Retrieval by existing wind turbine hardware (21) of values from different parameters, which could be wind direction, wind speed, nacelle position, produced power, twist limit condition of the wiring between tower and nacelle, yawing condition of the nacelle, and/or the wind turbine operating modes, namely emergency, stop, pause and production Checking the wind turbine operating mode, verifying the energy production in normal operation, i.e., in production mode, within preset wind speed ranges and without detecting alarms.
  a) If the operating mode is unsuitable, the check will be conducted again until the wind turbine is in the production mode.
  b) If the operating mode is suitable, there will be a check that the yawing and/or twist limit conditions are activated.

If the yawing and/or twist limit conditions are activated, the calculated yaw oscillations of the efficiency function are inhibited.

If the yawing and/or twist limit conditions are deactivated, a power optimization algorithm (FIG. 4 B) is launched and a signal known as the external deviation is obtained from this algorithm.

The optimization algorithm (FIG. 4 B) follows the steps below:
  a. Adaptation of the integrity of the input variables, filtering to check that they fall within the limits; where the limits of these parameters are determined on the basis of the particular characteristics of the wind turbine (1).
  b. Determining an efficiency function $y=f(\theta)$ by calculating the ratio between the generated power obtained by the corresponding sensors and the theoretically producible power, which is determined based on the multiplication of a configurable parameter based on constants specific to each wind turbine (1), including the rotor diameter and coefficients for maximum power and wind speed. Said parameter is the product of the air density (kg/m$^3$), the rotor surface (m$^2$) and the coefficient for maximum power (Cpmax) (atmospheric conditions: parameter_=0.5·1.225·π(diameter/2)$^2$·Cpmax).

c. Filtering of the efficiency function obtained in the previous step (s/s+h).

d. Demodulation of the signal obtained in the previous step, multiplying it by the actual value of the yaw oscillation signal (sin wt), obtaing ξ.

e. Filtering the signal obtained by k/s and determining a signal known as the gradient θ̇.

f. Accumulation of all the values obtained from the gradient signal since the beginning of calculations and integration thereof, thus attaining a signal known as external deviation θ.

2. Sending the external deviation θ signal to the yaw control system (11).

3. Comparison between the calculated external deviation value and the deviation value (α) determined by the wind sensors (7).

If the obtained value exceeds some preset values depending on the particular characteristics of the wind turbine (1), the yaw system will move the nacelle (4) following the reference accumulating the sum of the yawing and external deviation.

If the obtained value does not exceed the preset values, the control system (20) will impose an oscillatory movement onto the yaw system in addition to the movement of the previous step, so long as the wind conditions are within the preset safety limits.

The sum of the described yaw movements, together with the variations of the wind per se will determine a new operating and working mode of the wind turbine (1), which will be recorded by the hardware (21) thereof, and a new cycle will begin with these data.

While this invention has been described entirely in connection with preferential embodiments, modifications may clearly be made within its scope, which is not restricted by the aforementioned embodiments, but rather by the content of the following claims.

The invention claimed is:

1. A combination comprising:
a horizontal wind turbine including a nacelle, a rotor, rotor blades, a yaw system that moves the nacelle around a vertical yaw axis to position the rotor blades in an optimal position that is parallel to a wind direction, at least one sensor disposed within the wind turbine for measurement of a parameter that can be used to determine an internal deviation value of a position of the rotor blades from the optimal position, and a control system configured to prevent misalignment of the horizontal wind turbine, the control system comprising:
an acquisition unit that retrieves value of the parameter measured by the at least one sensor;
a calculation unit that calculates an external deviation value of the rotor blades from the optimal position using an optimization algorithm for determining an efficiency function y=ƒ(θ) that maximizes efficiency of the wind turbine by (i) forcing the yaw system to oscillate the nacelle at a frequency and amplitude that progressively orients the nacelle to a position that maximizes the efficiency function, (ii) filtering low frequencies to attenuate components that generate wind and meteorological characteristics, (iii) filtering high frequencies to attenuate components of the wind turbine, and (iv) measuring a position of maximum power in the forced oscillation to determine an optimal alignment θ* of the nacelle; and
a deviation comparison unit that determines a difference between the external deviation value calculated by the calculation unit and the internal deviation value determined from the measurement of the at least one sensor;
wherein the internal deviation value is based upon the measurement of the at least one sensor disposed within the wind turbine without any measurements taken by other devices external to the wind turbine;
wherein, if the difference between the external deviation value and the internal deviation value exceeds a preset value, the control system commands the yaw system to adjust the position of the nacelle to take account of the external deviation value; and
wherein the calculation unit further calculates the efficiency function by determining a ratio between an obtained generated power and a theoretically producible power, wherein the theoretically producible power is based on parameters including rotor diameter and maximum power and wind speed coefficients.

2. The control system according to claim 1, wherein the theoretically producible power is calculated by multiplying a configurable parameter that is characteristic of constants inherent in the wind turbine, the constants comprising the rotor diameter, maximum parameter and wind speed coefficients, the configurable parameter comprising a product of air density, a rotor surface and a coefficient for maximum power.

3. The control system according to claim 1, wherein the preset value is between 50 and 100.

4. The control system according to claim 1, wherein the control system prevents oscillation of the nacelle only when a yawing function or a twist limit function of the nacelle is activated.

5. The control system according to claim 1, wherein the optimization algorithm is an Extremum Seeking Control (ESC) algorithm.

6. The control system according to claim 1, wherein the optimization algorithm is a Hierarchical Optimistic Optimization (HOO) algorithm based on yaw sweeps.

7. The control system according to claim 1, wherein the optimization algorithm is a Modified Secant algorithm based on a Brent method.

8. The control system according to claim 1, wherein the wind turbine comprises a plurality of sensors which are configured and arrange for speed measurement, wind direction measurement, power measurement and rotor rotation measurement.

* * * * *

UNITED STATES PATENT AND TRADEMARK OFFICE
CERTIFICATE OF CORRECTION

PATENT NO. : 10,527,024 B2
APPLICATION NO. : 15/741418
DATED : January 7, 2020
INVENTOR(S) : Vital Amuchastegui et al.

Page 1 of 1

It is certified that error appears in the above-identified patent and that said Letters Patent is hereby corrected as shown below:

On the Title Page

Item (30), Foreign Application Priority Data: Line 1:
Delete "Jul. 30, 2015 (ES)..... 2015000494"
And insert --Jul. 03, 2015 (ES)..... 2015000494--

Signed and Sealed this
Twenty-second Day of December, 2020

Andrei Iancu
*Director of the United States Patent and Trademark Office*